United States Patent Office.

DORWIN DORMAN PENNOYER, OF COLEBROOK, NEW HAMPSHIRE, ASSIGNOR TO HIMSELF AND ALBERT HARVEY BROOKS, OF SAME PLACE.

Letters Patent No. 99,229, dated January 25, 1870.

IMPROVED PAINT OR COATING FOR ROOFS.

The Schedule referred to in these Letters Patent and making part of the same.

*To all persons to whom these presents may come:*

Be it known that I, DORWIN DORMAN PENNOYER, of Colebrook, of the county of Coos, and State of New Hampshire, have invented a new and useful Composition to be Applied to Roofs, &c.; and do hereby declare the same to be fully described in the following specification.

In carrying out my invention, or in other words, in making the said composition, add to six quarts of slaked lime, reduced to a very fine or impalpable powder, one quart of rock salt or chloride of sodium, and put the whole into one gallon, or thereabouts, of water, which afterwards heat to a boiling temperature, and skim clear.

To five gallons of the solution, add one pound of pulverized alum, one half a pound of pulverized copperas, half or three-quarters of a pound of powdered potash, and eight or ten pounds of clean fine sand; after which add to the mixture one pound of glue, dissolved in one pint of water.

The composition thus formed may be colored by the addition of one or more pigments, or suitable substances. Lamp-black, when employed, will cause the composition to have a gray color, while "Brandon brown" will give to it a pink or light brown shade.

In applying the composition to a roof or other surface, it may be spread thereon by means of a brush, as paint is usually applied by such. Two coats will impart a thickness of about a sixteenth of an inch.

I do not confine the ingredients of the composition to the exact proportions as above explained, as they may be varied somewhat, without materially changing the character and useful properties of the composition.

The compound, when applied to a roof or surface to be exposed to the weather, will not only preserve it from decay, but render it fire-proof, or very fire-resisting.

I claim, as my invention—

The composition, made of the ingredients, and in the manner and for the purpose substantially as hereinbefore explained.

DORWIN DORMAN PENNOYER.

Witnesses:
R. H. EDDY,
J. R. SNOW.